(12) United States Patent
Mujtaba

(10) Patent No.: US 7,903,755 B2
(45) Date of Patent: *Mar. 8, 2011

(54) METHOD AND APPARATUS FOR PREAMBLE TRAINING WITH SHORTENED LONG TRAINING FIELD IN A MULTIPLE ANTENNA COMMUNICATION SYSTEM

(75) Inventor: Syed A. Mujtaba, Watchung, NJ (US)

(73) Assignee: Agere Systems Inc., Allentown, PA (US)

(*) Notice: Subject to any disclaimer, the term of this patent is extended or adjusted under 35 U.S.C. 154(b) by 725 days.

This patent is subject to a terminal disclaimer.

(21) Appl. No.: 11/815,398

(22) PCT Filed: Feb. 8, 2006

(86) PCT No.: PCT/US2006/004467
§ 371 (c)(1),
(2), (4) Date: Aug. 6, 2007

(87) PCT Pub. No.: WO2006/086493
PCT Pub. Date: Aug. 17, 2006

(65) Prior Publication Data
US 2009/0122882 A1    May 14, 2009

Related U.S. Application Data

(60) Provisional application No. 60/651,346, filed on Feb. 9, 2005.

(51) Int. Cl.
*H04L 27/00* (2006.01)
(52) U.S. Cl. ........................................ 375/295
(58) Field of Classification Search ............ 375/295
See application file for complete search history.

(56) References Cited

U.S. PATENT DOCUMENTS

| 7,020,110 B2 * | 3/2006 | Walton et al. ............ 370/334 |
| 7,444,134 B2 * | 10/2008 | Hansen et al. ............ 455/412.1 |
| 2003/0072255 A1 * | 4/2003 | Ma et al. ............ 370/208 |
| 2003/0185241 A1 * | 10/2003 | Lu et al. ............ 370/476 |

(Continued)

FOREIGN PATENT DOCUMENTS

| WO | WO2005/006588 A2 | 1/2005 |
| WO | WO 2005/006700 A1 | 1/2005 |

OTHER PUBLICATIONS

Hebbar, "Empirical approach for rate selection in MIMO OFDM", Dec. 17, 2004 section 2.6 pp. 14-19, this document can be found at http://scholar.lib.vt.edu/theses/available /etd-01082005-153029/unrestricted/MasterThesisPdf.pdf.*

(Continued)

*Primary Examiner* — Juan A Torres
(74) *Attorney, Agent, or Firm* — Ryan, Mason & Lewis, LLP

(57) ABSTRACT

Methods and apparatus are provided for communicating data in a multiple antenna communication system having N transmit antennas. According to one aspect of the invention, a header format includes a legacy preamble having at least one legacy long training field and an extended portion having at least N additional long training fields on each of the N transmit antennas, wherein one or more of the at least N additional long training fields are comprised of only one Orthogonal Frequency Division Multiplexing (OFDM) symbol. The extended portion optionally comprises one or more repeated OFDM symbols for frequency offset estimation. In one implementation, the extended portion comprises a first high throughput long training field comprised of two repeated OFDM symbols and N−1 high throughput long training fields comprised of only one OFDM symbol. In another variation, the extended portion comprises N high throughput long training fields comprised of only one OFDM symbol.

18 Claims, 6 Drawing Sheets

U.S. PATENT DOCUMENTS

| | | | |
|---|---|---|---|
| 2004/0258025 A1* | 12/2004 | Li et al. | 370/334 |
| 2005/0054313 A1* | 3/2005 | Gummadi et al. | 455/226.1 |
| 2005/0111449 A1* | 5/2005 | Moorti et al. | 370/389 |
| 2005/0152314 A1* | 7/2005 | Sun et al. | 370/334 |
| 2005/0163081 A1* | 7/2005 | Aoki et al. | 370/334 |
| 2005/0174927 A1* | 8/2005 | Stephens et al. | 370/206 |
| 2005/0265472 A1* | 12/2005 | Takeda et al. | 375/267 |
| 2005/0281241 A1* | 12/2005 | Webster et al. | 370/343 |
| 2005/0281349 A1* | 12/2005 | Kim | 375/267 |
| 2005/0288062 A1* | 12/2005 | Hammerschmidt et al. | 455/562.1 |
| 2006/0008023 A1* | 1/2006 | Magee et al. | 375/267 |
| 2006/0088120 A1* | 4/2006 | Hansen et al. | 375/267 |
| 2006/0251193 A1* | 11/2006 | Kopmeiners et al. | 375/345 |
| 2008/0049654 A1* | 2/2008 | Otal et al. | 370/311 |
| 2009/0262859 A1* | 10/2009 | Trachewsky et al. | 375/267 |

OTHER PUBLICATIONS

Liu, "A MIMO System with Backward Compatibility for OFDM-Based WLANs," EURASIP Journal on Applied Signal Processing, vol. Jan. 2004, No. 5, pp. 696-706, 2004.*

Liu, "A MIMO System with Backward Compatibility for OFDM Based WLANs"; 4th IEEE Workshop on Signal Processing Advances in Wireless Communications, 2003,SPAWC 2003; Jun. 15-18, 2003 pp. 130-134.*

TGnSync, "An IEEE 802.11n Protocol Standard Proposal Alliance", Jun. 2004. This paper can be found at http://users.ece.utexas.edu/~rheath/courses/mimo/suggested_readings/ref/21-2.ppt.*

Ding, "Introduction to TGnSync 802.11n proposal", Sep. 27, 2004, pp. 18-28 this paper can be found at http://www.docstoc.com/docs/22587367/Introduction-of-TGnSync-80211n-proposal.*

IEEE802.11-04/0089r3, "TGn Sync Proposal Technical Specification", Jan. 2005. This document can be found at https://mentor.ieee.org/802.11/documents?n=10&o= 1d2d3d0d4a5a6a7d8a9a&is_year=2004.*

IEEE802.11-04/0088r8, "TGn Sync Complete Proposal" Jan. 18, 2005. This document can be found at https://mentor.ieee.org/802.11/documents?n=10&o= 1d2d3d0d4a5a6a7d8a9a&is_year=2004.*

* cited by examiner

METHOD AND APPARATUS FOR PREAMBLE TRAINING WITH SHORTENED LONG TRAINING FIELD IN A MULTIPLE ANTENNA COMMUNICATION SYSTEM

CROSS-REFERENCE TO RELATED APPLICATIONS

The present application claims priority to U.S. Provisional Patent Application Ser. No. 60/651,346, filed Feb. 9, 2005, incorporated by reference herein.

FIELD OF THE INVENTION

The present invention relates generally to multiple antenna wireless communication systems, and more particularly, to preamble training techniques for a multiple antenna communication system.

BACKGROUND OF THE INVENTION

Multiple transmit and receive antennas have been proposed to provide both increased robustness and capacity in next generation Wireless Local Area Network (WLAN) systems. The increased robustness can be achieved through techniques that exploit the spatial diversity and additional gain introduced in a system with multiple antennas. The increased capacity can be achieved in multipath fading environments with bandwidth efficient Multiple Input Multiple Output (MIMO) techniques. A multiple antenna communication system increases the data rate in a given channel bandwidth by transmitting separate data streams on multiple transmit antennas. Each receiver receives a combination of these data streams on multiple receive antennas.

In order to properly receive the different data streams, receivers in a multiple antenna communication system must acquire the channel matrix through training. This is generally achieved by using a specific training symbol, or preamble, to perform synchronization and channel estimation. It is desirable for multiple antenna communication systems to co-exist with legacy single antenna communications systems (typically referred to as Single Input Single Output (SISO) systems). Thus, a legacy (single antenna) communications system must be able to interpret the preambles that are transmitted by multiple antenna communication systems. Most legacy Wireless Local Area Network (WLAN) systems based upon OFDM modulation comply with either the IEEE 802.11a or IEEE 802.11g standards (hereinafter "IEEE 802.11a/g"). Generally, the preamble signal seen by the legacy device should allow for accurate synchronization and channel estimation for the part of the packet that the legacy device needs to understand. Previous MIMO preamble formats have reused the legacy training preamble to reduce the overhead and improve efficiency. Generally, the proposed MIMO preamble formats include the legacy training preamble and additional long training symbols, such that the extended MIMO preamble format includes at least one long training symbol for each transmit antenna or spatial stream.

A number of frame formats have been proposed for evolving multiple antenna communication systems, such as MIMO-OFDM systems. Existing frame formats provide inaccurate estimations for the MIMO systems, such as inaccurate power measurement or outdated frequency offset and timing offset information, or fail to provide full backwards compatibility to the legacy devices of some vendors. In one proposed MIMO frame format, each transmit antenna sequentially transmits one or more long training symbols, such that only one transmit antenna is active at a time. As the transmit antennas are switched on and off, however, the temperature of the corresponding power amplifier will increase and decrease, respectively. Generally, such heating and cooling of the power amplifier will lead to "breathing" effects that cause the transmitted signal to have a phase or magnitude offset, relative to the desired signal.

It is therefore desirable to have a continuous transmission from all transmit antennas to avoid temperature related signal "breathing." Thus, in further proposed MIMO frame formats, orthogonality is maintained using cyclic delay diversity (CDD) or tone-interleaving across different transmit antennas. The CDD short training symbol, however, cannot measure the received signal power with sufficient accuracy. Thus, additional backoff is required in the RF chain and additional dynamic range is required in the digitization process. Likewise, the tone interleaved design is not fully backwards compatible with a number of existing 802.11a/g devices that use short training for timing synchronization or use time domain channel estimation.

A need therefore exists for a method and system for performing channel estimation and training in a MIMO-OFDM system that is compatible with current IEEE 802.11a/g standard (SISO) systems, allowing MIMO-OFDM based WLAN systems to efficiently co-exist with SISO systems. A further need exists for MIMO preamble formats and training techniques that provide reduced preamble overhead.

SUMMARY OF THE INVENTION

Generally, methods and apparatus are provided for communicating data in a multiple antenna communication system having N transmit antennas. According to one aspect of the invention, a disclosed header format includes a preamble having at least one legacy long training field and an extended portion having at least N additional long training fields on each of the N transmit antennas, wherein one or more of said at least N additional long training fields are comprised of only one OFDM symbol. The extended portion optionally comprises one or more repeated OFDM symbols for frequency offset estimation. In one implementation, the extended portion comprises a first high throughput long training field comprised of two repeated OFDM symbols and N−1 high throughput long training fields comprised of only one OFDM symbol. In another variation, the extended portion comprises N high throughput long training fields comprised of only one OFDM symbol.

A more complete understanding of the present invention, as well as further features and advantages of the present invention, will be obtained by reference to the following detailed description and drawings.

DETAILED DESCRIPTION

The present invention provides preamble formats and techniques for preamble training for MIMO system. The training phase of a MIMO transmission will contain two phases. The first training phase is a legacy training phase particularly suited, for example, to WLAN OFDM legacy systems and the second phase is particularly suited to a multiple antenna system, such as a MIMO system. To overcome the problems in the prior systems, the Automatic Gain Control (AGC) of a receiver will perform one training sequence during the first training phase and the AGC of the receiver will retrain during the second training phase. This will allow the receiver to retrain its power measurements during the MIMO phase in order to ensure accuracy, while also allowing the receiver to be backwards compatible to WLAN systems that are not MIMO based.

Figure 1:
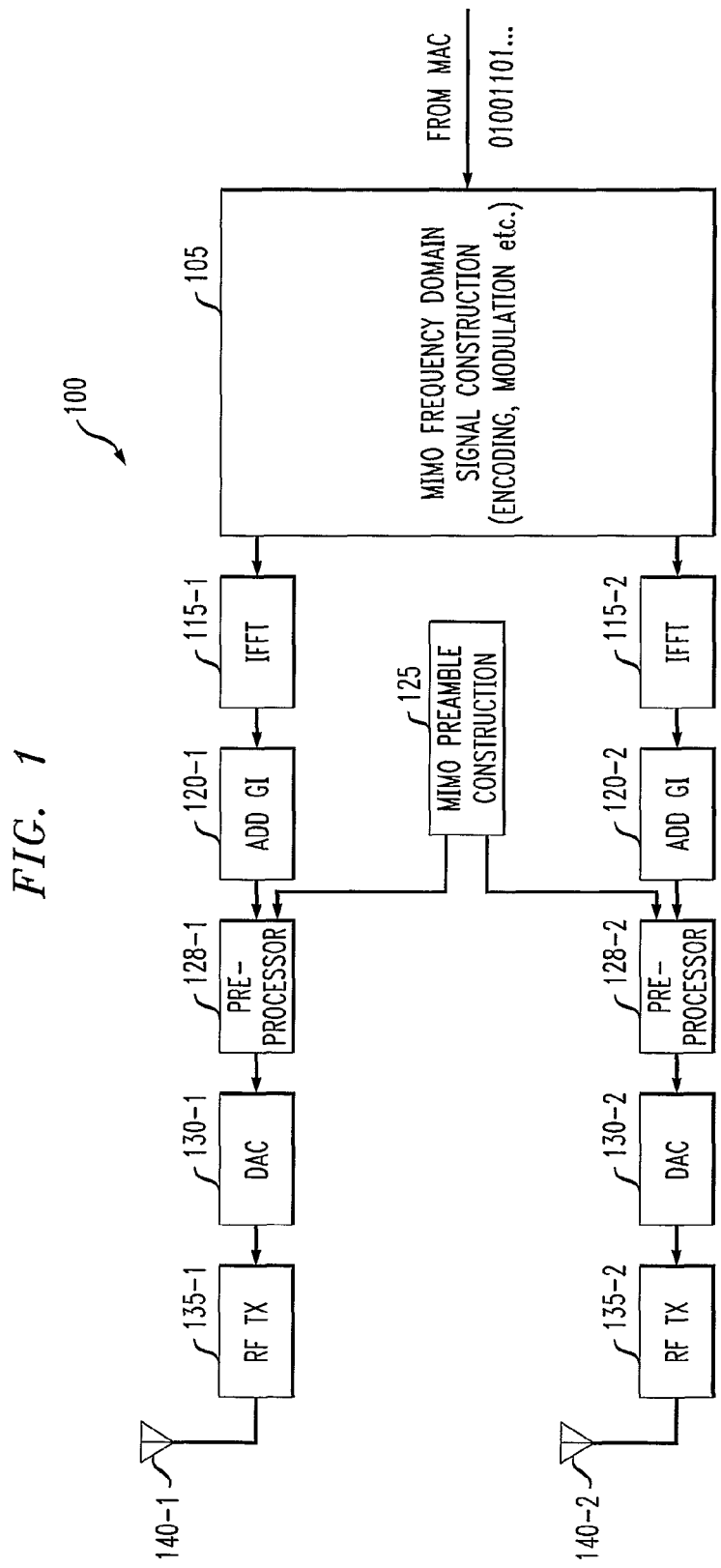
FIG. 1 is a schematic block diagram of an exemplary MIMO transmitter.

FIG. 1 is a schematic block diagram of a MIMO transmitter 100. As shown in FIG. 1, the exemplary two antenna transmitter 100 encodes the information bits received from the medium access control (MAC) layer and maps the encoded bits to different frequency tones (subcarriers) at stage 105. For each transmit branch, the signal is then transformed to a time domain wave form by an IFFT (inverse fast Fourier transform) 115-1 and 115-2. A guard interval (GI) of 800 nanoseconds (ns) is added in the exemplary implementation before every OFDM symbol by stage 120-1 and 120-2 and a preamble of 32 µs is added by stage 125 to complete the packet. The digital signal is then pre-processed at stage 128-1 and 128-2 and converted to an analog signal by converter 130-1 and 130-2 before the RF stage 135-1 and 135-2 transmits the signal on a corresponding antenna 140-1 and 140-2.

Figure 2:
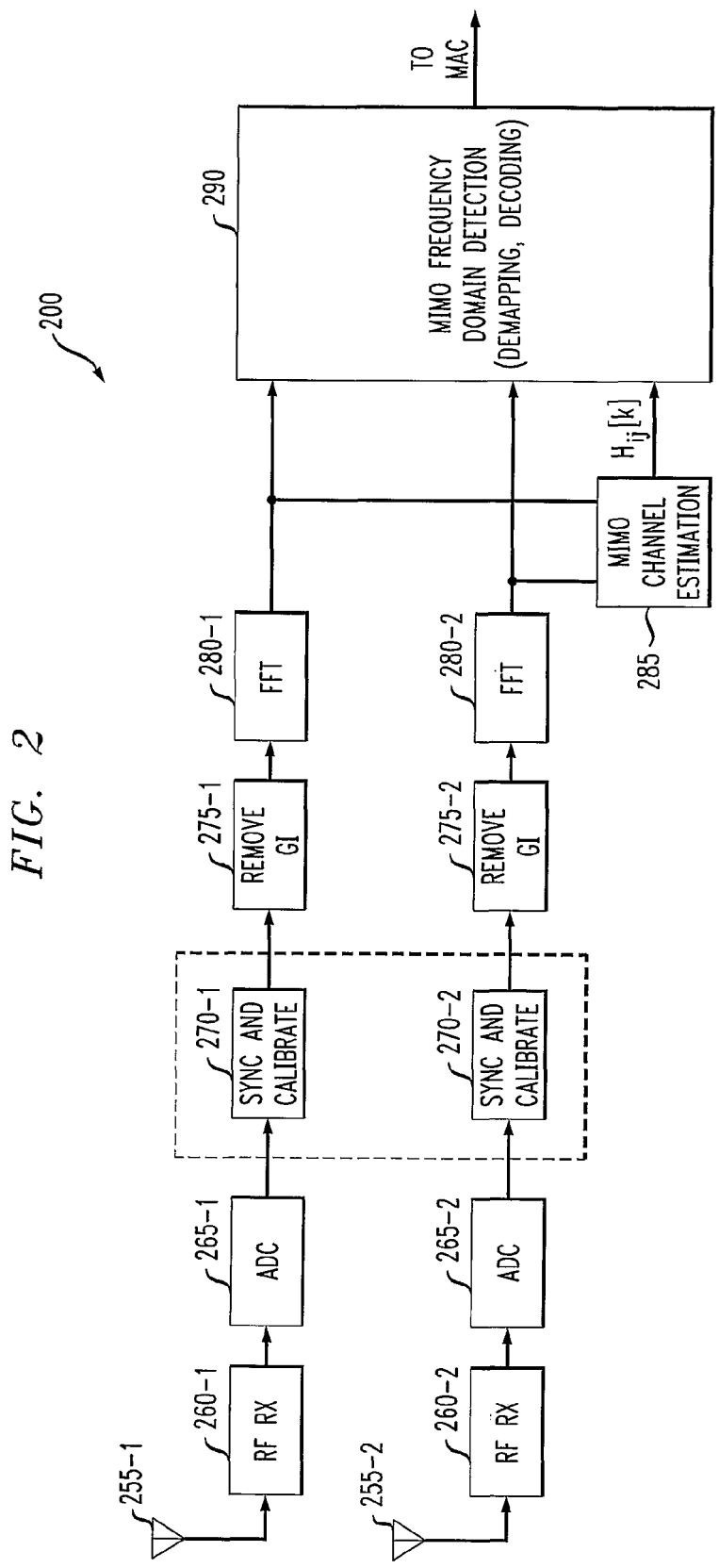
FIG. 2 is a schematic block diagram of an exemplary MIMO receiver.

FIG. 2 is a schematic block diagram of a MIMO receiver 200. As shown in FIG. 2, the exemplary two antenna receiver 200 processes the signal received on two receive antennas 255-1 and 255-2 at corresponding RF stages 260-1, 260-2. The analog signals are then converted to digital signals by corresponding converters 265-1 and 265-2. The receiver 200 processes the preamble to detect the packet, and then extracts the frequency and timing synchronization information at synchronization stage 270-1 and 270-2 for both branches. The guard interval is removed at stage 275-1 and 275-2. The signal is then transformed back to the frequency domain by an FFT at stage 280-1 and 280-2. The channel estimates are obtained at stage 285 using the long training symbol. The channel estimates are applied to the demapper/decoder 290, and the information bits are recovered.

Figure 3:
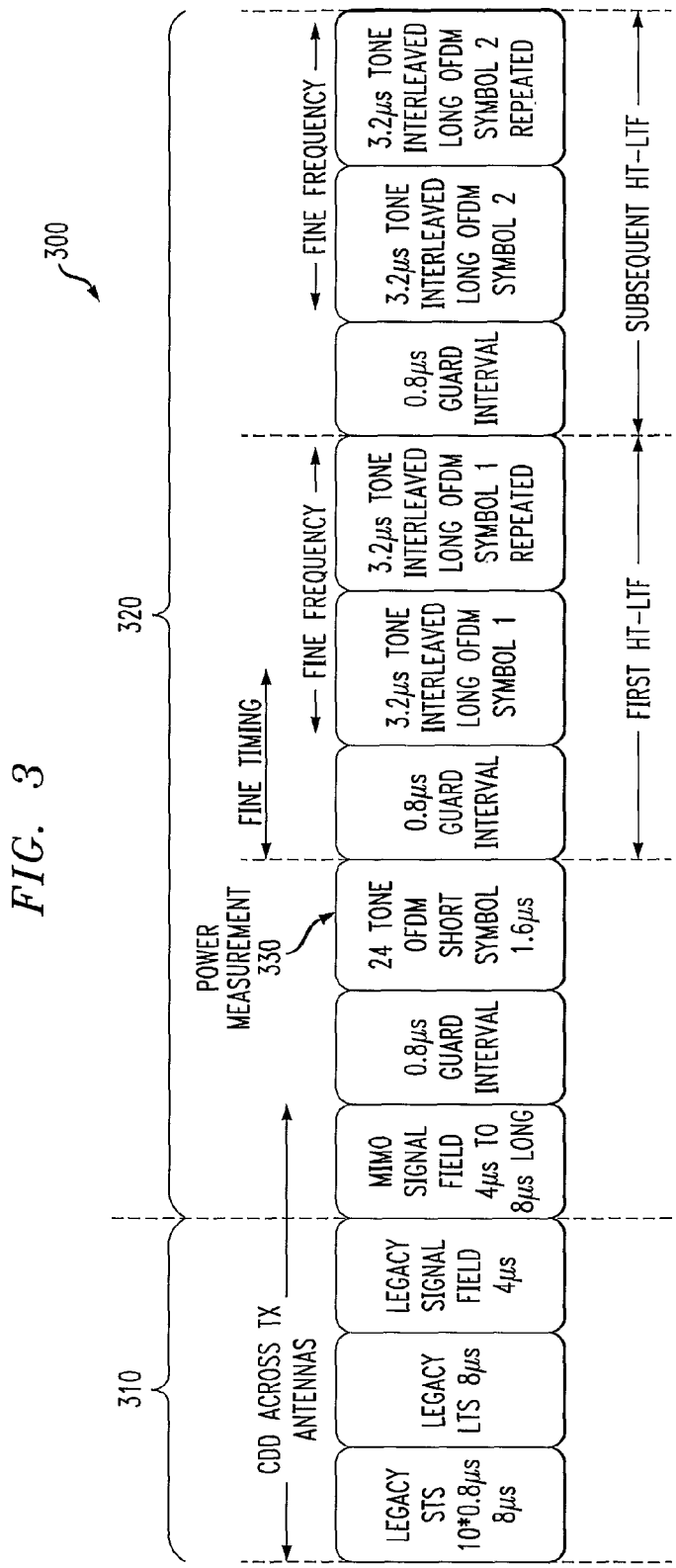
FIG. 3 illustrates a preamble design that is backwards compatible with 802.11a/g legacy devices.

FIG. 3 illustrates a preamble design 300 that is backwards compatible with 802.11a/g legacy devices. The preamble design 300 provides a dedicated legacy portion 310 with a signal field for backward compatibility and a dedicated MIMO training portion 320 for performance of the MIMO system.

For a detailed discussion of an implementation of the preamble design of FIG. 3 and techniques for employing cyclic delay diversity (CDD) or tone-interleaving across different transmit antennas, see, for example, U.S. patent application Ser. No. 11/043,025, filed Jan. 24, 2005, entitled "Method And Apparatus For Preamble Training In A Multiple Antenna Communication System," incorporated by reference herein.

In the exemplary preamble design 300, the transmitter 100 first transmits the legacy 802.11a/g preamble 310, for example, using CDD. The legacy preamble 310 permits the performance of packet detection and coarse frequency offset estimation. The results of these two functions are also going to be used in the MIMO transmission. In addition to these two functions, the legacy preamble 310 is used to perform legacy AGC, timing and frequency synchronization and channel estimation, in a known manner. The receiver 200 then decodes the subsequent legacy and HT signal fields. The HT signal field is also transmitted using CDD. As shown in FIG. 3, following the legacy and HT signal fields is a MIMO short training field 330 and then the MIMO long training fields. The MIMO short training field 330 is used only to adjust the AGC setting, and the length can be much shorter than the legacy short training field. As illustrated herein, the MIMO short training field includes a 0.8 µs guard interval and a 1.6 µs training symbol for the accurate power measurement.

It is noted that the preamble format 300 of FIG. 3 may not use the first Long Preamble in the legacy header for MIMO channel estimation. The dedicated short training symbol 330 allows precise power measurement for MIMO, at the expense of higher preamble overhead (9.6 µs extra). Hence, the preamble format 300 provides low dynamic range requirements (ten bit ADC). The MIMO long training fields of FIG. 3 can be transmitted on the same frequency grid as the data. Thus, Frequency Domain Channel Estimation (FDE) may be performed.

The short training field 330 of FIG. 3 can be constructed in a tone-interleaved fashion. While an OFDM symbol with 12 tones (i.e., 0.8 us long) would be sufficient to provide accurate power across four antennas, a 24-tone OFDM symbol (i.e. 1.6 us long) provides even more accuracy, at the expense of slightly larger overhead. The populated tones are interleaved across the transmit antennas.

Since the short training symbol 330 is only 1.6 µs long, only 24 tones are used (of 64 total available tones). The indices of those tones are all multiples of four, so that the resulting time domain signal has a period of 1.6 µs. In the exemplary two antenna case, only half of the tones are transmitted on each transmitter antenna, i.e., every other used tone is transmitted on the first antenna and the rest of tones are transmitted on the second antenna. Moreover, this short training symbol 330 can be further shortened to 0.8 µs, which only uses 12 tones, to reduce the overhead.

Figure 4:
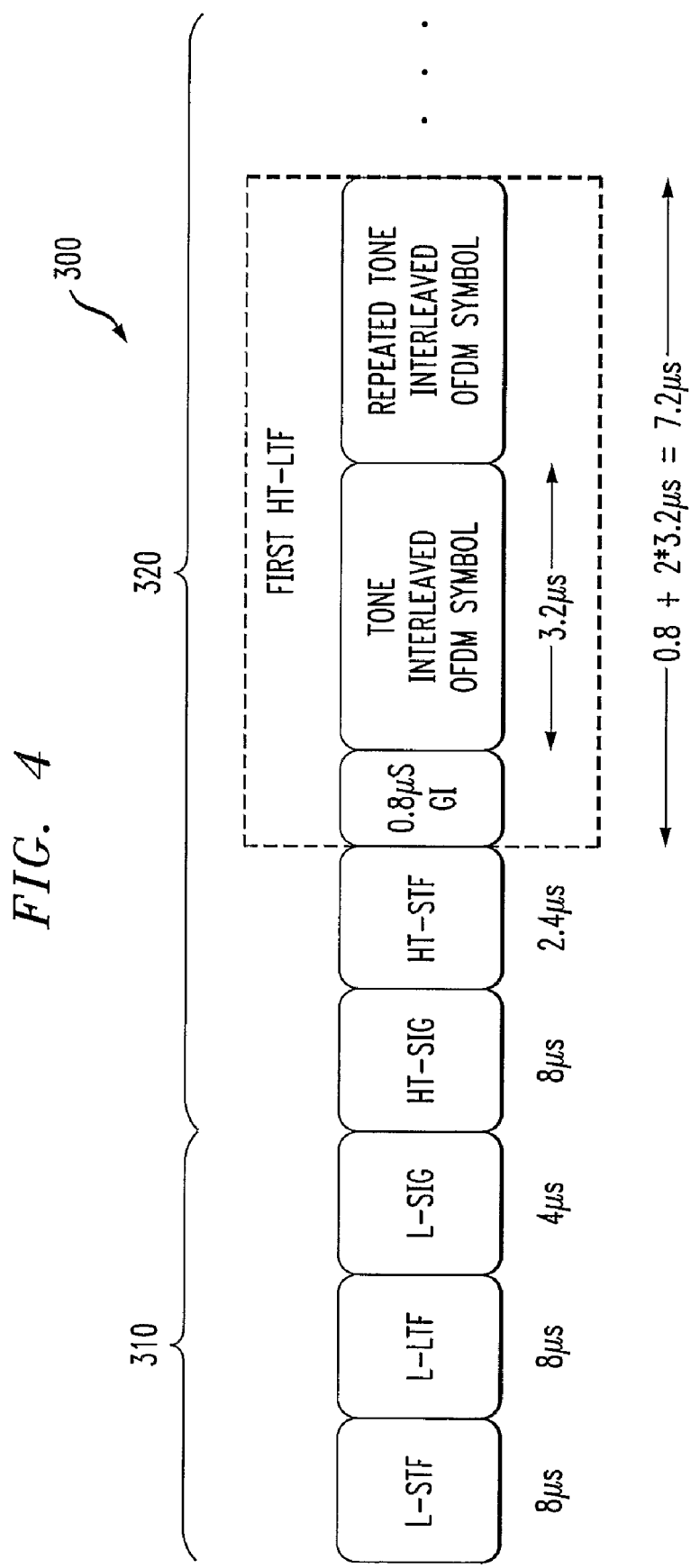
FIG. 4 illustrates the preamble format of FIG. 3 in further detail.

FIG. 4 illustrates the preamble format 300 of FIG. 3 in further detail. The preamble design 300 provides the dedicated legacy portion 310 with a signal field for backward compatibility and a dedicated MIMO training portion 320 for performance of the MIMO system. As shown in FIG. 4, the dedicated MIMO training portion 320 includes two OFDM symbols for each MIMO long training field (HT-LTF). Thus, a single MIMO long training field in the exemplary embodiment shown in FIGS. 3 and 4 comprises a guard interval and two tone interleaved OFDM symbols for a total duration of 7.2 µs (0.8+2*3.2 µs). It is noted that the preamble format 300 generally comprises N additional long training fields on each of N transmit antennas. Thus, the total duration of the preamble is 30.4 µs (8*3+4+2.4 µs)+N*7.2 µs. In a typical four antenna implementation, the preamble duration is 59.2 µs. The channel estimation performance that has been observed for the preamble format 300 having two OFDM symbols for each MIMO long training field is 1.76 dB less than that with an ideal channel estimation (i.e., this demonstrates the nominal channel estimation error).

Figure 5:
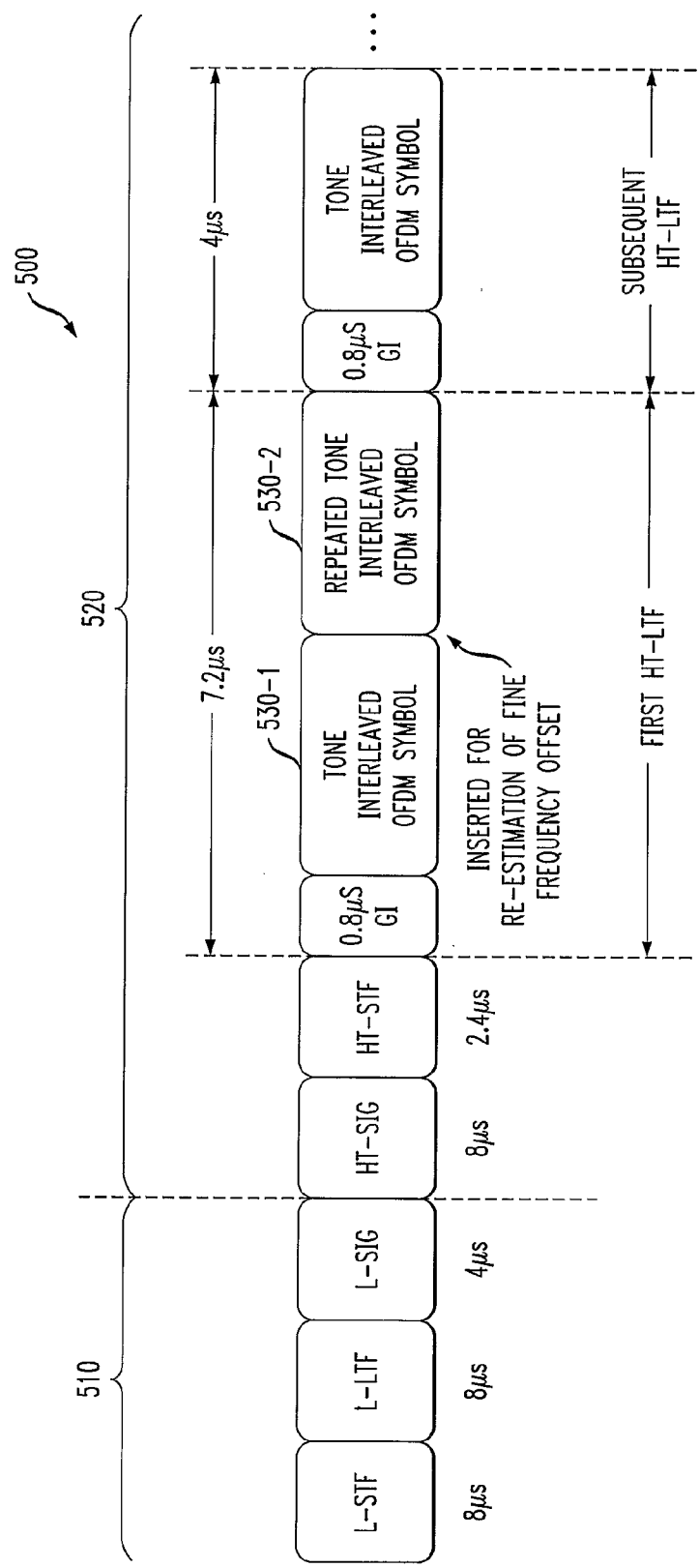
FIG. 5 illustrates a preamble format incorporating features of the present invention.

FIG. 5 illustrates a preamble format 500 incorporating features of the present invention. The preamble design 500 provides the dedicated legacy portion 510 with a signal field for backward compatibility and a dedicated MIMO training portion 520 for performance of the MIMO system. As shown in FIG. 5, the first MIMO long training field (HT-LTF) contains a repeated OFDM symbol 530-1, 530-2. The motivation for repeating the OFDM symbol is to allow for a re-estimation of the fine frequency offset. However, unlike the format 320, the "subsequent" N−1 MIMO long training fields do not contain a repeated OFDM symbol. This leads a reduction in the overall length of the preamble. Therefore, the length of the preamble can now be computed as follows:

For N=1, length=30.4+7.2=37.6 us
For N=2 and greater, length=37.6+(N−1)*4 us where N equals the number of spatial streams (or equivalently transmit antennas). In a typical four antenna implementation, the preamble duration is thus 49.6 μs. Note that by not repeating the OFDM symbol in subsequent MIMO long training fields, the error in channel estimation in the subsequent MIMO long training fields increases from 1.76 dB to 3 dB.

Figure 6:
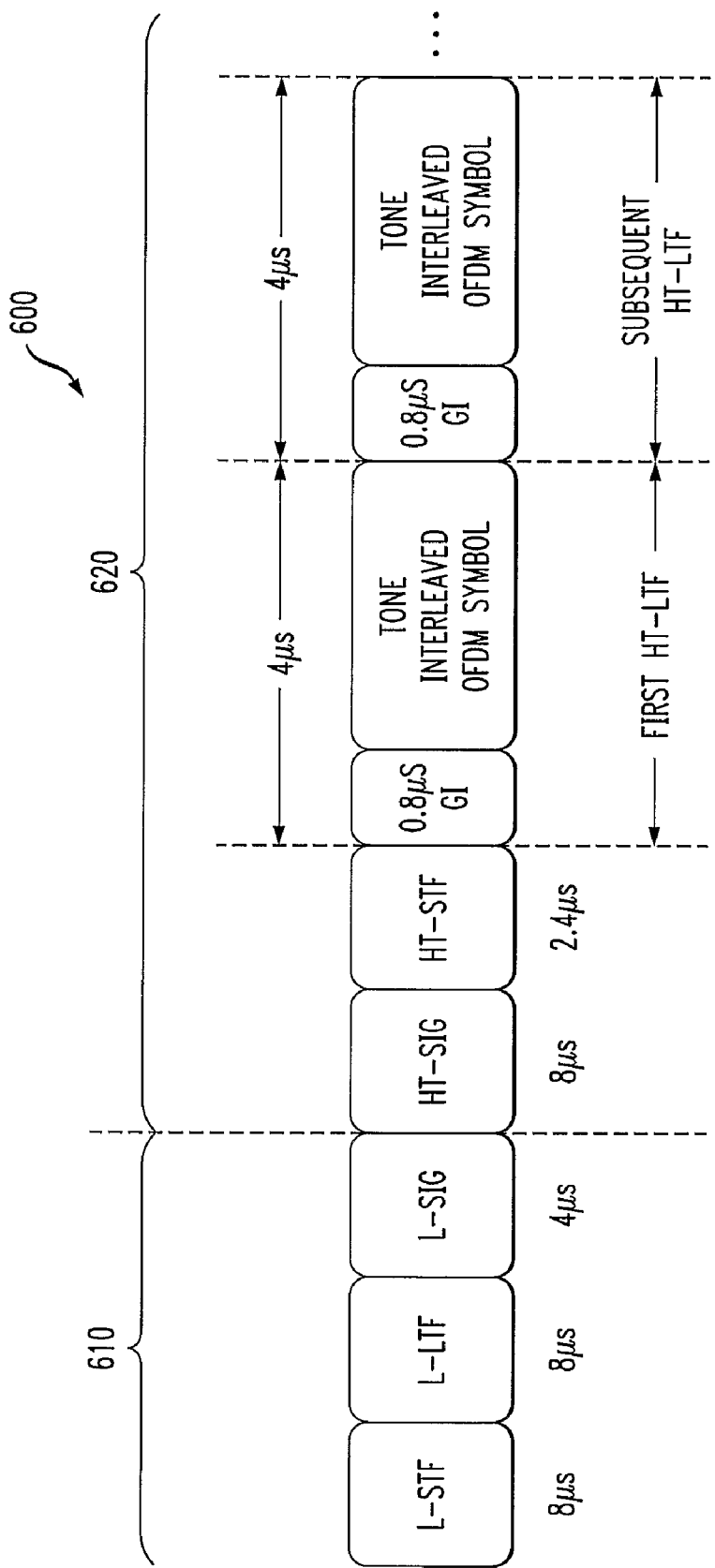
FIG. 6 illustrates an alternate preamble format incorporating features of the current invention.

FIG. 6 illustrates a preamble format 600 incorporating features of the current invention. The preamble design 600 provides the dedicated legacy portion 610 with a legacy signal field for backwards compatibility and a dedicated MIMO long training portion 620 to achieve performance of the MIMO system. As shown in FIG. 6, neither the first nor the subsequent MIMO Long Training Fields (HT-LTF) are repeated. This leads to the shortest possible preamble design, whose length is given by (30.4+N*4) us, where N is the number of spatial streams. For preamble format 600, the increase in channel estimation error is 3 dB over that of an ideal channel estimation.

The present invention recognizes that shortening each MIMO long training field (HT-LTF) from two OFDM symbols to one OFDM symbol increases the channel estimation error while reducing the preamble overhead. It has been observed that the preamble formats 500, 600 having one OFDM symbol per MIMO long training field outperforms the preamble format 300 having two OFDM symbols per MIMO long training field (in the sense of throughput versus SNR (dB)) at high SNR and larger number of spatial streams (N). Meanwhile, at lower SNR, performance of the two formats is comparable It is to be understood that the embodiments and variations shown and described herein are merely illustrative of the principles of this invention and that various modifications may be implemented by those skilled in the art without departing from the scope and spirit of the invention.

I claim:

1. A method for transmitting a preamble in a multiple antenna communication system having N transmit antennas, said method comprising the steps of:
   obtaining a preamble having at least one long training field and an extended portion having at least N additional long training fields, wherein one of said at least N additional long training fields is comprised of two OFDM symbols, wherein N−1 of said at least N additional long training fields consist of only one OFDM symbol and wherein N is an integer greater than one; and
   transmitting said preamble on each of said N transmit antennas.

2. The method of claim 1, wherein said preamble is a legacy preamble.

3. The method of claim 2, wherein said legacy preamble further comprises at least one short training symbol and one SIGNAL field.

4. The method of claim 2, wherein said legacy preamble is an 802.11a/g preamble.

5. The method of claim 1, wherein said extended portion further includes a short training field for power estimation.

6. The method of claim 1, wherein said extended portion further includes a signal field identifying a preamble format.

7. The method of claim 1, wherein said extended portion further comprises one or more additional OFDM symbols for frequency offset estimation.

8. The method of claim 1, wherein said extended portion comprises a first high throughput long training field comprised of two repeated OFDM symbols and N−1 high throughput long training fields comprised of only one OFDM symbol.

9. The method of claim 1, wherein said extended portion comprises N high throughput long training fields comprised of only one OFDM symbol.

10. A transmitter in a multiple antenna communication system, comprising:
    a transmitter circuit; and
    N transmit antennas for transmitting a preamble having at least one long training field and an extended portion having at least N additional long training fields on each of said N transmit antennas, wherein one of said at least N additional long training fields is comprised of two OFDM symbols, wherein N−1 of said at least N additional long training fields consist of only one OFDM symbol and wherein N is an integer greater than one.

11. The transmitter of claim 10, wherein said preamble is a legacy preamble.

12. The transmitter of claim 11, wherein said legacy preamble further comprises at least one short training symbol and one SIGNAL field.

13. The transmitter of claim 10, wherein said N additional long training fields are tone interleaved across said N transmit antennas.

14. The transmitter of claim 10, wherein only said N additional long training fields are used for MIMO channel estimation.

15. The transmitter of claim 10, wherein said extended portion further includes one or more of a short training field for power estimation and a signal field identifying a preamble format.

16. The transmitter of claim 10, wherein said extended portion further comprises one or more additional OFDM symbols for frequency offset estimation.

17. The transmitter of claim 10, wherein said extended portion comprises a first high throughput long training field comprised of two repeated OFDM symbols and N−1 high throughput long training fields comprised of only one OFDM symbol.

18. The transmitter of claim 10, wherein said extended portion comprises N high throughput long training fields comprised of only one OFDM symbol.

* * * * *